US009596107B2

(12) United States Patent
Iwamura

(10) Patent No.: US 9,596,107 B2
(45) Date of Patent: Mar. 14, 2017

(54) ELECTRICAL DISPERSION COMPENSATOR AND TAP COEFFICIENT CALCULATION METHOD SUITABLY APPLICABLE THERETO

(71) Applicant: Oki Electric Industry Co., Ltd., Tokyo (JP)

(72) Inventor: Hideyuki Iwamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/711,229

(22) Filed: May 13, 2015

(65) Prior Publication Data

US 2015/0365262 A1 Dec. 17, 2015

(30) Foreign Application Priority Data

Jun. 16, 2014 (JP) ................................ 2014-123253

(51) Int. Cl.
*H04L 25/03* (2006.01)
*H04B 10/69* (2013.01)

(52) U.S. Cl.
CPC ... *H04L 25/03878* (2013.01); *H04B 10/6971* (2013.01); *H04L 25/03019* (2013.01); *H04L 2025/03477* (2013.01)

(58) Field of Classification Search
CPC .............. H04B 10/2508; H04B 10/697; H04B 10/6971; H04B 10/2507; H04L 7/0037; H04L 7/007; H04L 25/03012; H04L 25/03878; H04L 25/03019
USPC .................. 375/350, 355, 229–232; 398/208
See application file for complete search history.

(56) References Cited

U.S. PATENT DOCUMENTS

| | | | | |
|---|---|---|---|---|
| 5,442,582 | A * | 8/1995 | Lange | H04L 27/01 375/235 |
| 5,648,988 | A * | 7/1997 | Iwamatsu | H04L 27/38 375/229 |
| 2002/0027952 | A1 * | 3/2002 | Kokuryo | H04L 25/03038 375/230 |

(Continued)

FOREIGN PATENT DOCUMENTS

| | | |
|---|---|---|
| JP | 2006-174073 A | 6/2006 |
| JP | 2006-287695 A | 10/2006 |
| JP | 2008-205654 A | 9/2008 |

OTHER PUBLICATIONS

Japanese Office Action mailed on Jul. 21, 2015 with English Translation.

(Continued)

*Primary Examiner* — Betsy Deppe
(74) *Attorney, Agent, or Firm* — Rabin & Berdo, P.C.

(57) ABSTRACT

There is provided an apparatus allowing waveform shaping even at a low sampling rate, which includes a sampling unit, an equalizing unit, a tap coefficient calculating unit, a delay adjusting unit, a peak monitoring unit, and a timing value extracting unit. The timing value extracting unit provides a magnitude of a delay to the delay adjusting unit, and from a plurality of sets of the magnitude of the delay provided by the delay adjusting unit and maximum values of output signal intensity acquired by the peak monitoring unit, acquires the magnitude of a delay where the output signal intensity becomes the greatest, as a suitable delay amount, and notifies the delay adjusting unit of the suitable delay amount.

3 Claims, 8 Drawing Sheets

(56) References Cited

U.S. PATENT DOCUMENTS

| | | | | |
|---|---|---|---|---|
| 2004/0223568 | A1* | 11/2004 | Liu | H04L 7/0037 375/355 |
| 2008/0272943 | A1 | 11/2008 | Tanimura et al. | |

OTHER PUBLICATIONS

Hirotaka Nakamura et al., "Tunable WDM/TDM-PON using DWBA for flexible service upgrade", NIT Access Network Service Systems Laboratories, NIT Corporation, 2010.

* cited by examiner

ELECTRICAL DISPERSION COMPENSATOR AND TAP COEFFICIENT CALCULATION METHOD SUITABLY APPLICABLE THERETO

CROSS REFERENCE TO RELATED APPLICATION(S)

This application is based upon and claims benefit of priority from Japanese Patent Application No. 2014-123253, filed on Jun. 16, 2014, the entire contents of which are incorporated herein by reference.

BACKGROUND

The present invention relates to an electrical dispersion compensator and a tap coefficient calculation method performed in the electrical dispersion compensator. Specifically, it relates to a technology to successfully perform waveform shaping in a case of a low sampling rate.

In an optical access network that receives a wide variety of service requests from users, traffic demand has been temporally and spatially ubiquitous, so that novel network architecture for highly-efficient network control will be required in the future.

As one example of the network architecture capable of such as providing optimum communication capability and integrating different kinds of services, a WDM/TDM-PON is under consideration, which is configured by adding a wavelength division multiplexing (WDM) technology to a conventional passive optical network (PON) technology based on a time division multiplexing (TDM) technology, and performs waveform shaping according to a traffic usage situation on a network (see, for example, the publication entitled "λ-tunable WDM/TDM-PON using DWBA for flexible service upgrade" by Hirotaka Nakamura et al., 2010, the Institute of Electronics, Information and Communication Engineers, Communications Society Conference, B-10-40).

This technology enables drive control of an optical line terminal (OLT) according to traffic to improve band usage efficiency, so that a center office is expected to achieve low power consumption. The WDM/TDM-PON is aimed at widening a coverage area by capacity enlargement and multi branching, thus requiring OLT integration by extending a transmission distance.

As for a technology to extend the transmission distance, a wavelength dispersion compensating technology is used for coping with a problem of deterioration in waveform due to wavelength dispersion. The wavelength dispersion compensating technology includes an electrical dispersion compensating (EDC) technology (see, for example, JP 2006-287695A). The EDC technology is a technology to correct a signal waveform distorted by the wavelength dispersion by using digital signal processing.

Here, the digital signal processing includes sampling a signal having a deteriorated waveform through transmission, comparing the signal with a signal before the transmission in terms of values at sampling points, and performing waveform shaping so as to bring the values after the transmission close to the values before the transmission. The digital signal processing is conducted by using an equalizer, or the like.

SUMMARY

At this time, in a case of a high sampling rate, resolution of the waveform shaping is increased to allow the waveform shaping with high accuracy. However, a high-speed calculation processing capability is required to cause a DSP chip and the like configuring a receiver to be driven at a high speed, thereby increasing power consumption.

Whereas, in a case of a low sampling rate, the problem may be raised in which reduced sampling points cause insufficient quantization, thus causing an error unless sampling timing is optimized. Referring to FIG. 1 and FIG. 2, how a waveform is affected by the shift of the sampling timing will be discussed. FIG. 1 is a diagram showing the shift of the sampling timing and the shaped waveforms. In FIG. 1, the signal waveforms subjected to the waveform shaping are compared between a case of twice the sampling rate of a data rate (a high sampling rate) and a case of the sampling rate equal to the data rate (a low sampling rate), while changing the sampling timing.

With the use of an feed forward equalizer (FFE) having a tap count of 5 and a data rate of 10 Gbps, when sampling timing of an electrical signal having a waveform deteriorated by using a low pass filter (LPF) of 5 GHz is changed by increments of 25 ps, as shown in FIG. 1, a change in waveform is small in a case of a high sampling rate (20 GHz sampling), while a change in waveform is large in a case of a low sampling rate (10 GHz sampling). The change in waveform is remarkable in a case of sampling timing of 0 ps and 75 ps.

FIG. 2 is a plot diagram obtained by sampling the signal having the deteriorated waveform at the low sampling rate. FIG. 2 shows that the distribution of the sampling points is deformed in a case of 0 ps and 75 ps, which shows a large change in waveform in FIG. 1, and the signal is not sampled correctly.

The present invention has been developed in light of the problem described above. It is desirable to provide an electrical dispersion compensator allowing waveform shaping even in a case of a low sampling rate by adjusting start timing of sampling, and a tap coefficient calculation method suitably applicable to the electrical dispersion compensator.

According to an aspect of the present invention, there is provided an electrical dispersion compensator which includes a sampling unit, an equalizing unit, a tap coefficient calculating unit, a delay adjusting unit, a peak monitoring unit, and a timing value extracting unit.

The sampling unit generates a sampling signal by sampling inputted data at a predetermined sampling rate. The equalizing unit generates an output signal by branching the sampling signal to signals of a tap count L, then weighting the signals by using a tap coefficient $w_x$, then adding a delay to the signals so as to have a time difference from each other, obtained by dividing a bit period T by a sampling rate K, and then adding the weighted signals. The tap coefficient calculating unit acquires a tap coefficient so that a training signal before transmission becomes similar to the output signal from the equalizing unit, and notifies the equalizing unit of the tap coefficient. The delay adjusting unit adjusts sampling timing by giving a predetermined delay to a clock signal and sending the clock signal having the delay to the sampling unit. The peak monitoring unit acquires a maximum value of signal intensity of the sampling unit.

The timing value extracting unit instructs magnitude of the delay to the delay adjusting unit, and from a plurality of sets of the magnitude of the delay given by the delay adjusting unit and the maximum values of the output signal intensity acquired by the peak monitoring unit, acquires the magnitude of a delay where the maximum value of the output signal intensity becomes maximum, as a delay suitable amount, and notifies the delay adjusting unit of the delay suitable amount.

Here, the timing value extracting unit may determine an approximate curve of the plurality of sets of the magnitude of the delay given by the delay adjusting unit and the maximum values of the output signal intensity acquired by the peak monitoring unit, and acquire the magnitude of a delay where the approximate curve becomes maximum, as a delay suitable amount.

Further, the timing value extracting unit may compare a maximum value $M(T_0)$ of signal intensity when giving predetermined magnitude of a delay $T_0$ with a maximum value $M(T_0+\Delta T)$ of signal intensity when adding a minimum unit $\Delta T$ of a delay change to the predetermined magnitude of the delay $T_0$. When the former is larger, the timing value extracting unit may newly define a value obtained by adding ½ of a sampling interval of the sampling unit to the predetermined magnitude of the delay $T_0$ as magnitude of a delay $T_0$, and make the comparison described above. When the latter is larger, the timing value extracting unit may determine a positive or a negative of $Y(n)\times Y(n+1)$ of a gradient $Y(n)$ given by $Y(n)=M(T_0+(n+1)\times\Delta T)-M(T_0+n\times\Delta T)$ while incrementing n of an integer n of 0 or more from 0 by 1, and when $Y(n)\times Y(n+1)<0$ is obtained as a result of the determination of a positive or a negative of $Y(n)\times Y(n+1)$, the timing value extracting unit may acquire $T=T_0+(n+1)\times\Delta T$ as a delay suitable amount.

Further, the timing value extracting unit may compare a maximum value $M(T_0)$ of signal intensity when giving predetermined magnitude of a delay $T_0$ with a maximum value $M(T_0+\Delta T)$ of signal intensity when adding a minimum unit $\Delta T$ of a delay change to the predetermined magnitude of the delay $T_0$. When the former is larger, the timing value extracting unit may newly define a value obtained by adding ½ of a sampling interval of the sampling unit to the predetermined magnitude of the delay $T_0$ as magnitude of a delay $T_0$, and make the comparison described above. When the latter is larger, the timing value extracting unit may determine a positive or a negative of $Z(n)\times Z(n+1)$ of a gradient $Z(n)$ given by $Z(n)=M(T_0+(n+1)\times(n+2)\times\Delta T/2)-M(T_0+n\times(n+1)\times\Delta T/2)$ while incrementing n of an integer n of 0 or more from 0 by 1, and when $Z(n)\times Z(n+1)<0$ is obtained as a result of the determination of a positive or a negative of $Z(n)\times Z(n+1)$, newly define $M(T_0+n\times(n+1)\times\Delta T/2)$ as $T_0$, and determine a positive or a negative of $Y(n)\times Y(n+1)$ of a gradient $Y(n)$ given by $Y(n)=M(T_0+(n+1)\times\Delta T)-M(T_0+n\times\Delta T)$ while incrementing n from 0 by 1, and when $Y(n)\times Y(n+1)<0$ is obtained as a result of the determination of a positive or a negative of $Y(n)\times Y(n+1)$, acquire $T=T_0+(n+1)\times\Delta T$ as a delay suitable amount.

Moreover, according to another aspect of the present invention, there is provided a tap coefficient calculation method which is performed in the electrical dispersion compensator described above, and includes the following steps.

First, a plurality of sets of magnitude of a delay given by the delay adjusting unit and maximum values of output signal intensity acquired by the peak monitoring unit may be acquired. Next, the magnitude of a delay where the maximum value of the output signal intensity becomes maximum may be acquired as a delay suitable amount.

According to the aspects of the present invention described above, successful waveform shaping can be performed by adjusting sampling timing even in a case of a low sampling rate.

DETAILED DESCRIPTION OF THE EMBODIMENT(S)

Figure 1:
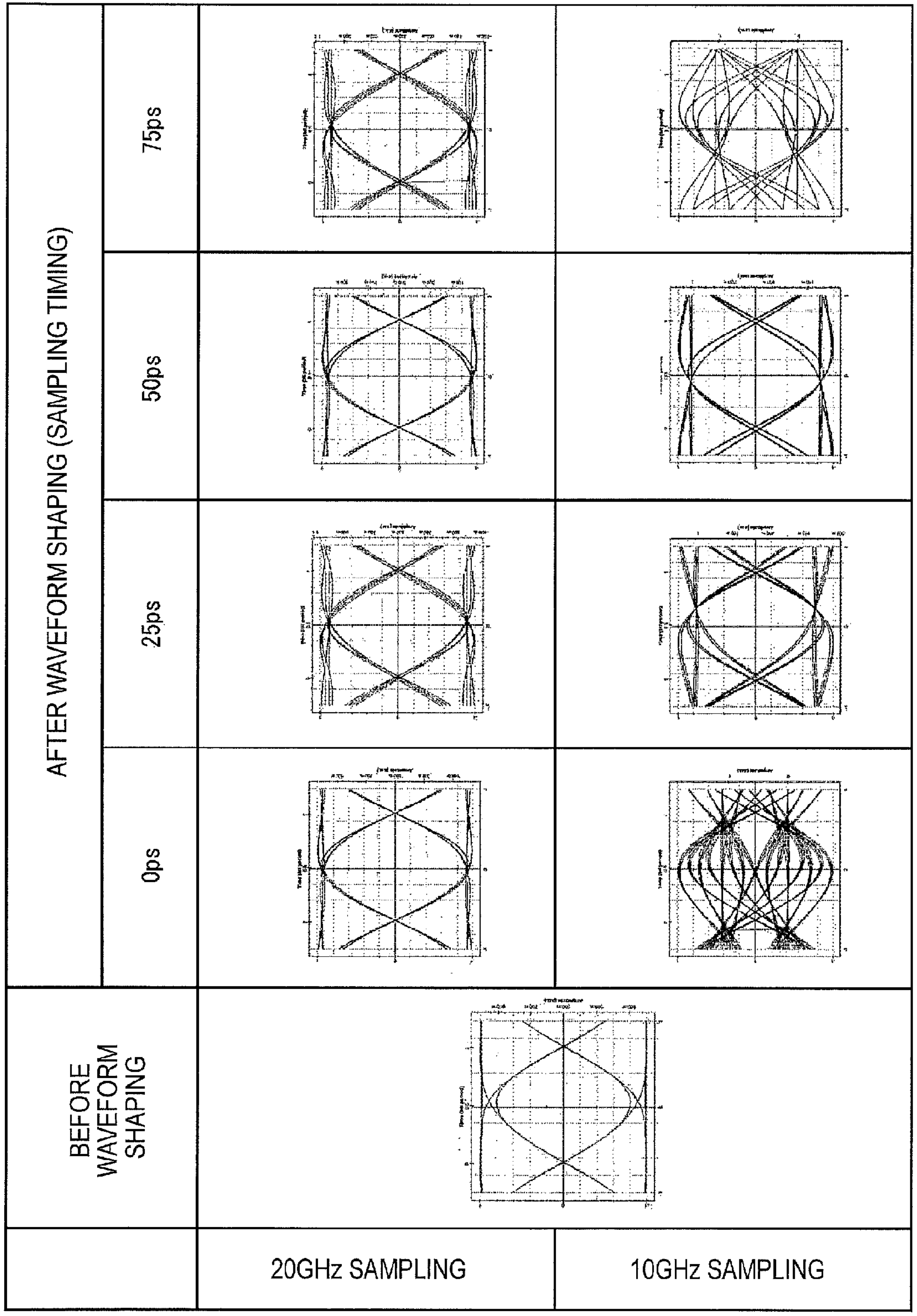
FIG. 1 is a diagram showing a shift of sampling timing and shaped waveforms.
Figure 2:
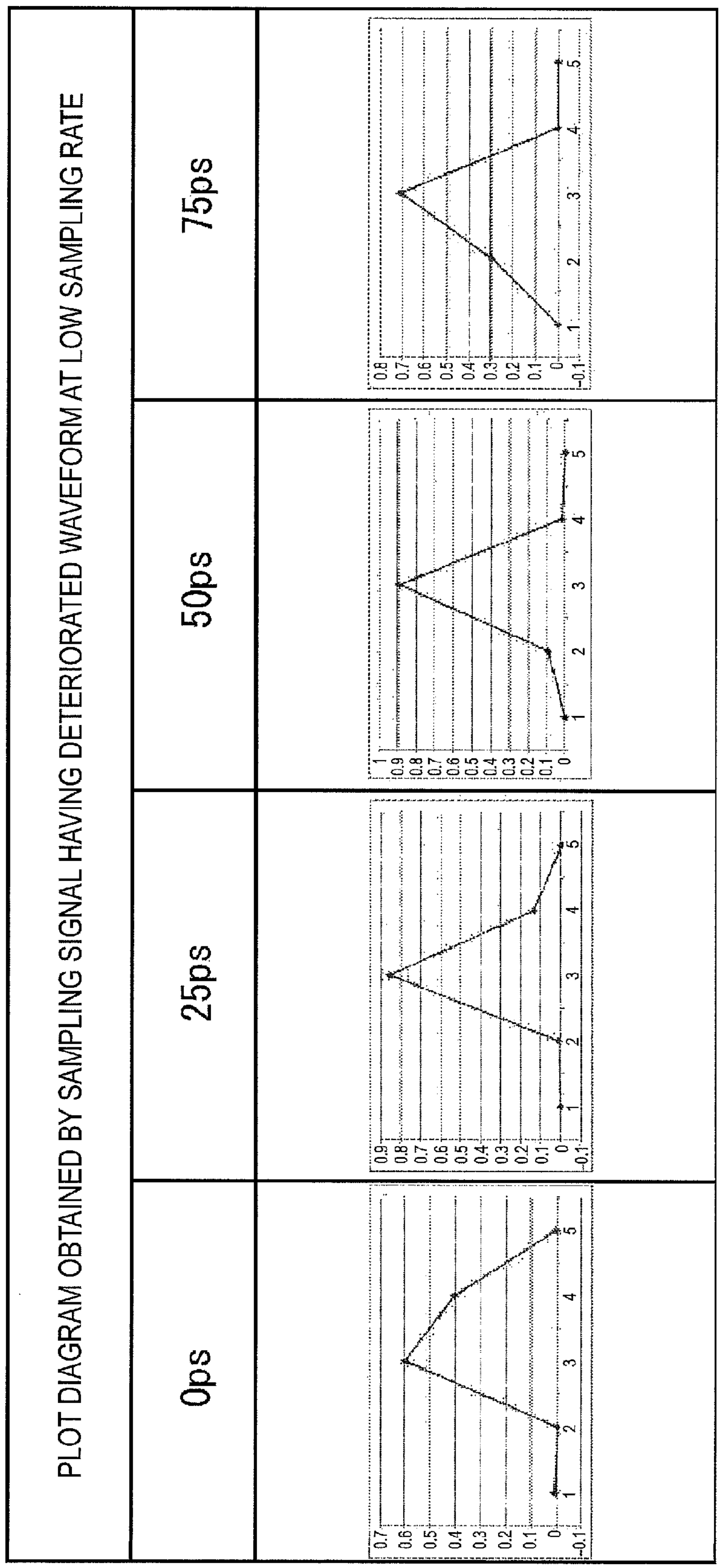
FIG. 2 is a plot diagram obtained by sampling a signal having a deteriorated waveform at a low sampling rate.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Figure 3:
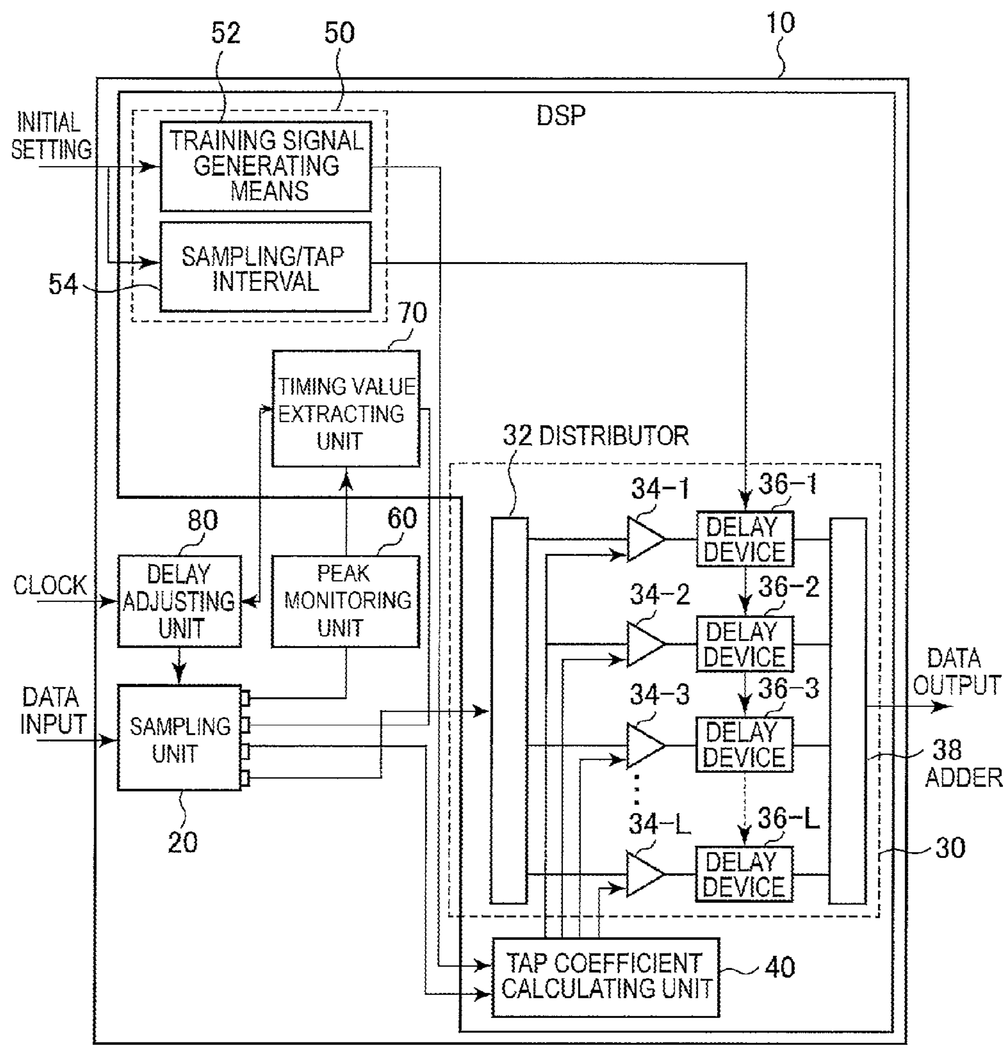
FIG. 3 is a schematic diagram showing an electrical dispersion compensator according to an embodiment of the present invention.

Referring to FIG. 3, an electrical dispersion compensator according to an embodiment of the present invention will be described. FIG. 3 is a schematic diagram showing the electrical dispersion compensator according to the embodiment. An electrical dispersion compensator 10 according to the embodiment includes a sampling unit 20, an equalizing unit 30, a tap coefficient calculating unit 40, an initial setting unit 50, a peak monitoring unit 60, a timing value extracting unit 70, and a delay adjusting unit 80. The initial setting unit 50 includes a training signal generating means 52 and sampling/tap interval 54. The equalizing unit 30, the tap coefficient calculating unit 40, the initial setting unit 50 and the timing value extracting unit 70 may be configured as a digital signal processor (DSP).

The sampling unit 20 is a unit that samples an analog electrical signal as received data. The sampling unit 20 includes, for example, an analog-to-digital converter (ADC). A sampling signal as an output of the sampling unit 20 is transmitted to the equalizing unit 30.

The equalizing unit 30 branches the sampling signal to signals, weights the signals, adds a delay thereto, and then overlaps the weighted signals. The equalizing unit 30 includes weighting circuits 34-1 to 34-L, delay devices 36-1 to 36-L, a distributor 32, and an adder 38, where L is a tap count. Here, the tap count L corresponds to the number of branches.

The sampling signal is branched to L branches of signals that are transmitted to the first to Lth weighting circuits 34-1 to 34-L, respectively. The weighting circuits 34-1 to 34-L weight the signals by using a tap coefficient $w_x$ (x is an integer of 1 or more and L or less). The signals weighted by the weighting circuits 34-1 to 34-L are transmitted to the first to Lth delay devices 36-1 to 36-L where the signals are given a predetermined delay, and the signals having the delay are added by the adder 38, and the added signal is outputted as an output signal. Note that the equalizing unit 30 described above may be configured as any known suitable FFE.

The delay adjusting unit 80 gives a predetermined delay to a clock signal and transmits the clock signal having the delay to the sampling unit 20. The delay adjusting unit 80 includes a variable delay device capable of changing the magnitude of a delay according to an instruction from the outside. The delay adjusting unit 80 sets a delay amount according to an instruction from the timing value extracting unit 70.

The magnitude of the delay given by the delay adjusting unit 80 is adjusted to adjust sampling timing. The delay adjusting unit 80 gradually changes the magnitude of the delay and transmits information on the magnitude of the delay to the timing value extracting unit 70.

The output of the sampling unit 20 is transmitted to the peak monitoring unit 60. The peak monitoring unit 60 includes, for example, a memory such as a RAM, and acquires a maximum value of output signal intensity of the sampling unit 20. The maximum value of the output signal intensity is transmitted to the timing value extracting unit 70. The maximum value of the output signal intensity is acquired for each magnitude of the delay in the delay adjusting unit 80.

The timing value extracting unit 70 extracts a delay amount when the output signal intensity becomes maximum, as a delay suitable amount. The timing value extracting unit 70 notifies the delay adjusting unit 80 of the delay suitable amount.

A tap coefficient is calculated in the tap coefficient calculating unit 40 and transmitted to the equalizing unit 30. Note that the tap coefficient is calculated after the delay amount is set to the delay suitable amount in the delay adjusting unit 80.

The tap coefficient calculating unit 40 receives a reference signal as a known training signal generated in training signal generating means 52 of the initial setting unit 50, from the initial setting unit 50. Further, the tap coefficient calculating unit 40 receives a transmission training signal as a training signal affected by deterioration through a transmission path, from the sampling unit 20. The tap coefficient calculating unit 40 determines a tap coefficient so that the transmission training signal corresponds to the reference signal. As this approach for determining the tap coefficient is conventionally known, explanation thereof is omitted.

Here, the configuration in which the output of the sampling unit is transmitted to the equalizing unit has been described, but is not limited thereto. The inputted signal may be branched to two signals and one may be transmitted to the sampling unit to determine the tap coefficient and the other may be transmitted to the equalizing unit not through the sampling unit. In this case, the equalizing unit and the tap coefficient calculating unit may include an equalizer, and the initial setting unit and the timing value setting unit may include a programmable chip.

(First Method for Extracting Timing Value)

Figure 4:
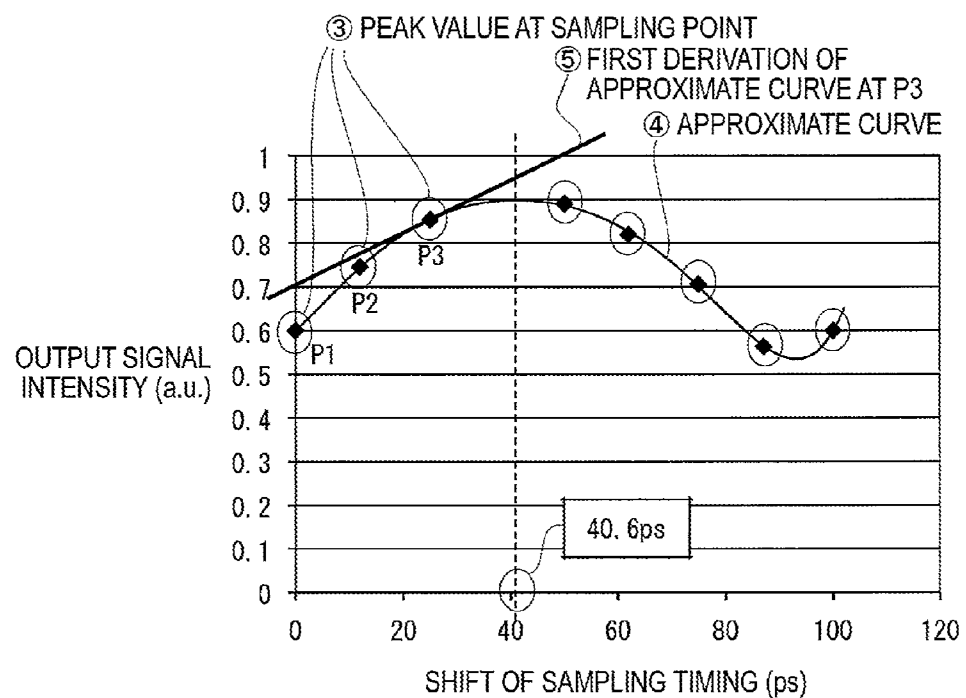
FIG. 4 is a schematic diagram for explaining a first method for extracting a timing value.

Referring to FIG. 4, a first method for extracting a timing value will be described. FIG. 4 is a schematic diagram for explaining the first method for extracting a timing value.

In the first method, the timing value extracting unit 70 may calculate an approximate curve indicating the maximum value of the output signal intensity for the magnitude of the delay. In an example shown in FIG. 4, 8 sets as a plurality of sets of the magnitude of the delay and the maximum values of the output signal intensity may be taken and approximated by using a quantic function. The magnitude where the approximate curve becomes maximum may be a delay suitable amount. The timing value extracting unit 70 may notify the delay adjusting unit 80 of the delay suitable amount.

In this example, the delay suitable amount is 40.6 ps.

Figure 5:
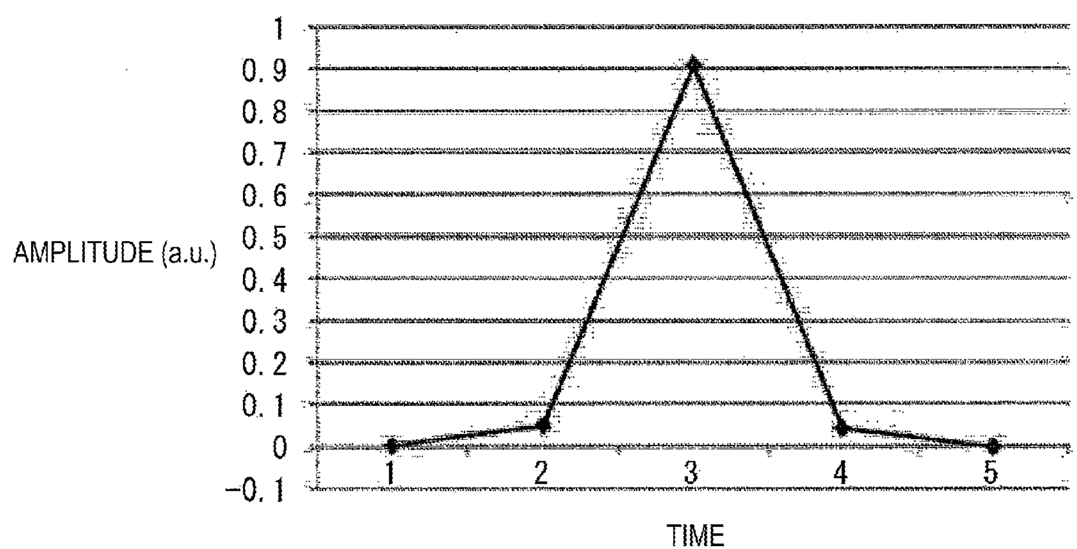
FIG. 5 is a plot diagram obtained by sampling a signal at a low sampling rate in a case of a delay amount of 40.6 ps in a delay adjusting unit.
Figure 6:
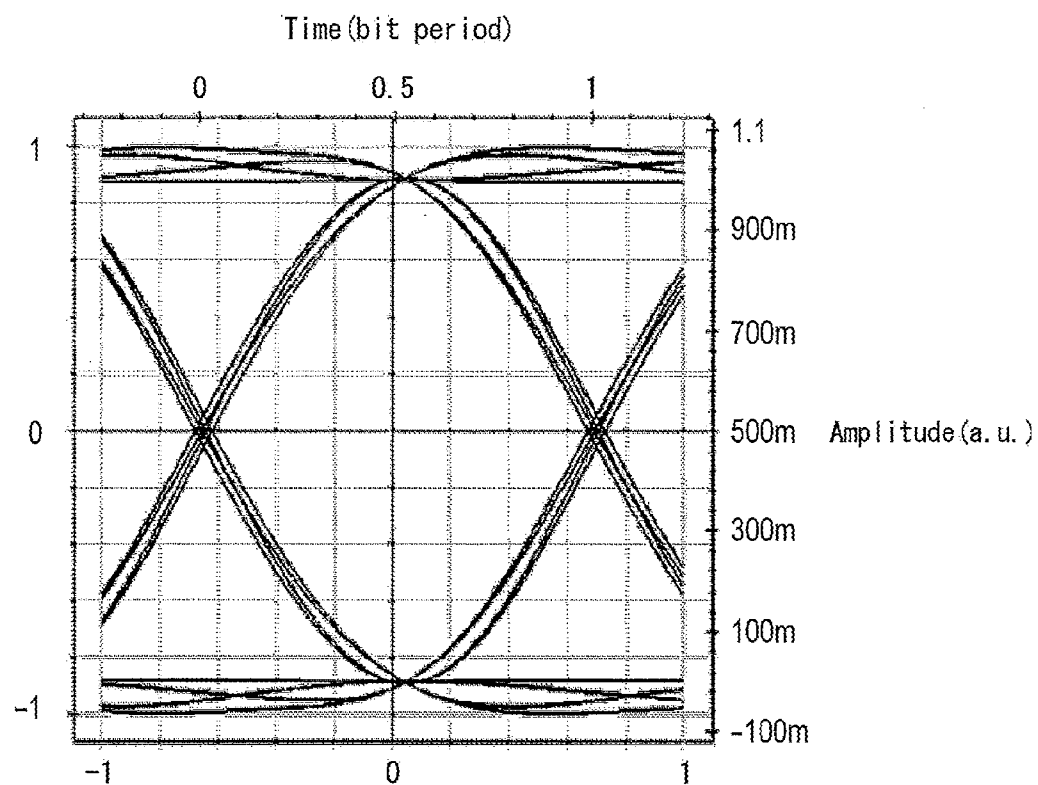
FIG. 6 is a diagram showing an eye diagram.

FIG. 5 is a plot diagram obtained by sampling a signal at a low sampling rate in a case of a delay amount of 40.6 ps in the delay adjusting unit 80. The plot diagram shown in FIG. 5 shows that the distribution of the sampling points is not deformed at the delay amount of 40.6 ps and a signal is correctly sampled. Further, FIG. 6 is a diagram showing an eye diagram. As shown in FIG. 6, the eye aperture is opened wide, the waveform has a nearly symmetric shape, and so on, and the signal having a waveform correctly shaped is obtained.

Figure 7:
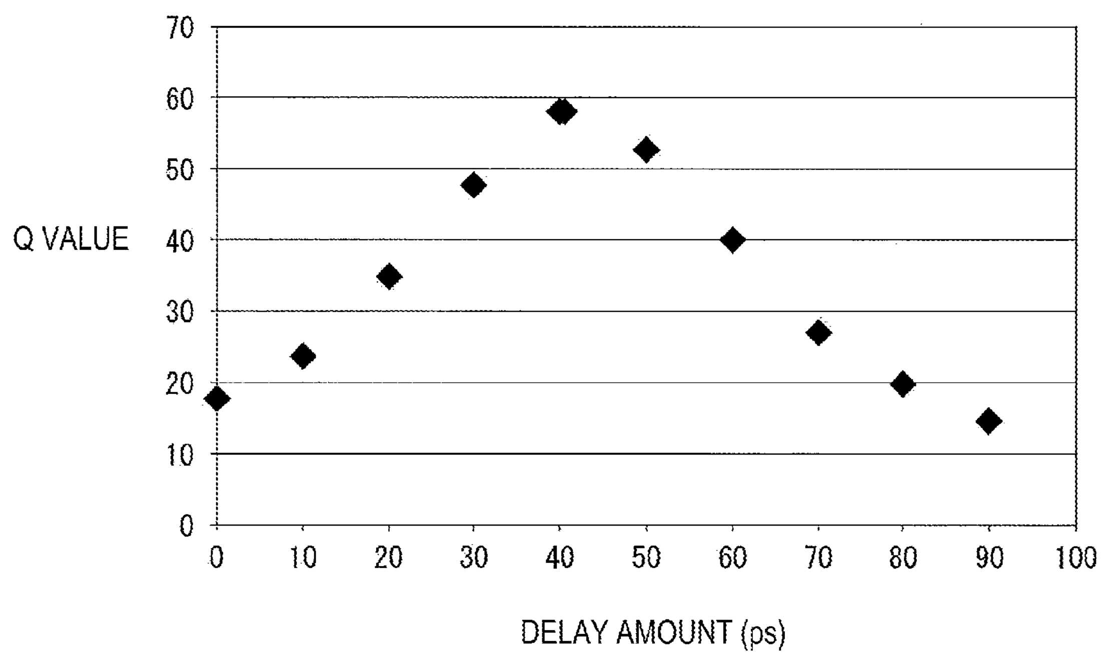
FIG. 7 is a diagram showing a relationship between a delay amount and a Q value indicating an eye aperture ratio.

Moreover, FIG. 7 is a diagram showing a relationship between a delay amount and a Q value indicating an eye aperture ratio. In FIG. 7, the horizontal axis represents a delay amount indicating sampling timing and the vertical axis represents a Q value. For example, the Q value is given by $Q=(SH-SL)/(\sigma H+\sigma L)$, where SH is an average value of signal intensity of an H-level signal, SL is an average value of signal intensity of an L-level signal, and σH and σL are standard deviations thereof.

The largest Q value is obtained when the delay amount is 40.6 ps as determined by the first method.

Here, the example that the 8 points of plots are approximated by using the quantic function to obtain the delay suitable amount where the peak value becomes maximum has been described, but a method for acquiring a delay suitable amount is not limited thereto.

The approximate formula is not limited to the quantic function, and any suitable function may be used according to a tendency of the distribution of the plots. Further, the number of plots may be reduced without affecting the calculation of the approximate curve. Further, the number of plots may be increased without causing a problem of prolongation of a time required for measurement and calculation of the approximate curve.

Moreover, when the number of plots can be sufficiently increased, a delay amount giving maximum intensity among sets of the magnitude of the delay and the maximum values of the signal intensity may be acquired as a delay suitable amount without determining the approximate curve.

(Second Method for Extracting Timing Value)

Figure 8:
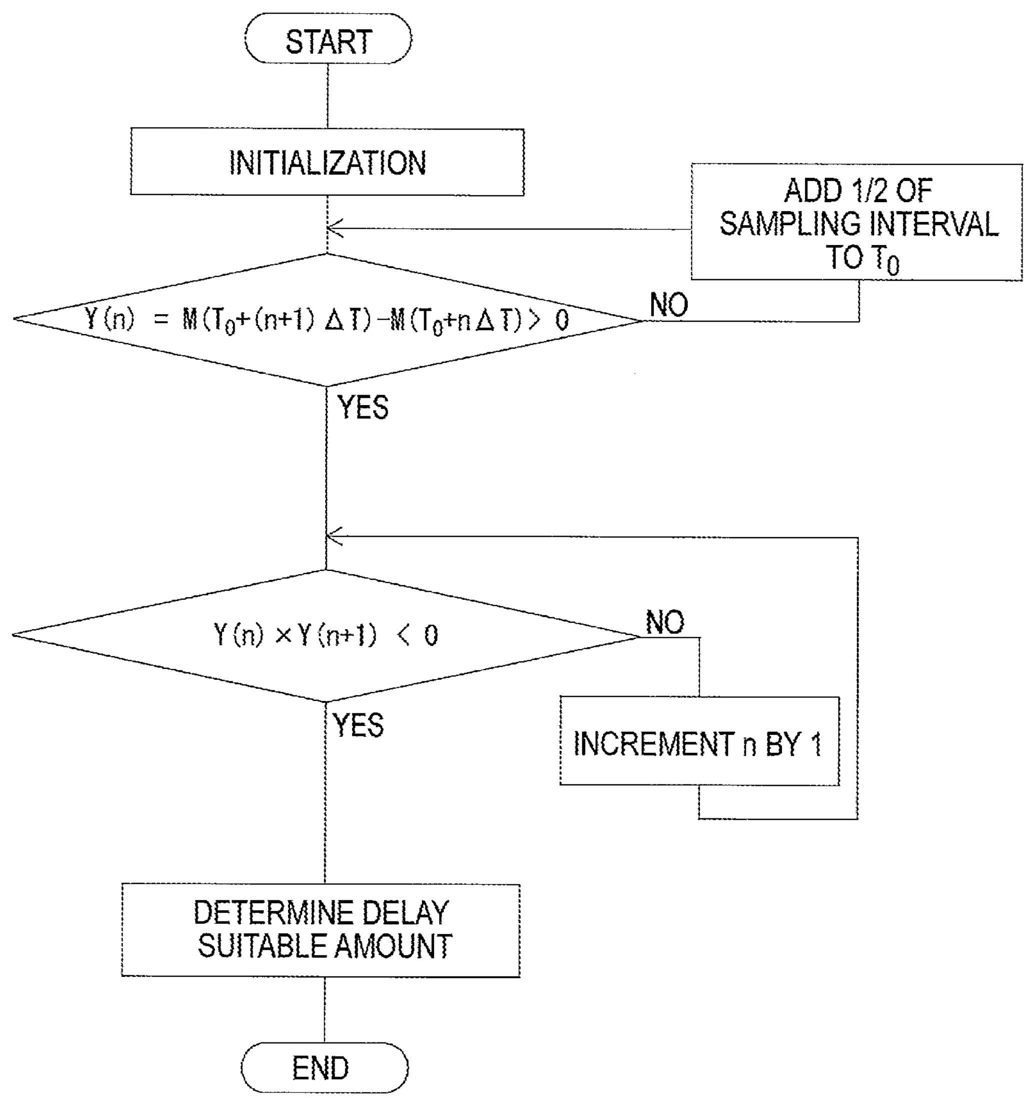
FIG. 8 is a flow chart for explaining a second method for extracting a timing value.

Referring to FIG. 8, a second method for extracting a timing value will be described. FIG. 8 is a flow chart for explaining the second method for extracting a timing value. Signal intensity at timing T is M(T), and a minimum setting unit of the timing T is ΔT.

First, a maximum value $M(T_0)$ of output signal intensity of any sampling timing, and a maximum value $M(T_0+\Delta T)$ of output signal intensity when the sampling timing is shifted by ΔT may be acquired as initialization.

When a parameter n is 0, a positive or a negative of a gradient $Y(0)=M(T_0+\Delta T)-M(T_0)$ may be determined. When the gradient Y(0) is a negative, the gradient is a negative gradient. The maximum value of the output signal intensity increases for ½ of a sampling interval to reach maximum intensity, and then decreases for ½ of the sampling interval. That is, the increase and the decrease are repeated by using the sampling interval as one cycle. Here, when the gradient $Y(0)$ is negative, ½ of the sampling timing may be added to the sampling timing T, and signal intensity $M(T_0)$ and $M(T_0+\Delta T)$, and a gradient $Y(0)$ may be acquired again. In this case, typically $Y(0)>0$ is obtained.

Next, the polarity of the gradient may be compared. A point where the gradient $Y(n)$ is 0 is an extreme value, but the gradient often fails to be 0. Therefore, the extreme value may be obtained by inversion of the polarity of the gradient $Y(n)$. Here, a positive or a negative of $Y(n)\times Y(n+1)$ may be determined, while incrementing n of an integer n of 0 or more from 0 by 1. Here, the $Y(n)$ is given by $Y(n)=M(T_0+(n+1)\times\Delta T)-M(T_0+n\times\Delta T)$. For example, $Y(0)=M(T_0+\Delta T)-M(T_0)$, $Y(1)=M(T_0+2\Delta T)-M(T_0+\Delta T)$, $Y(2)=M(T_0+3\Delta T)-M(T_0+2\Delta T)$, and so on are obtained. When $Y(n)\times Y(n+1)<0$ is obtained as a result of the determination of a positive or a negative of $Y(n)\times Y(n+1)$, $T=T_0+(n+1)\times\Delta T$ may be acquired as a delay suitable amount.

(Third Method for Extracting Timing Value)

Figure 9:
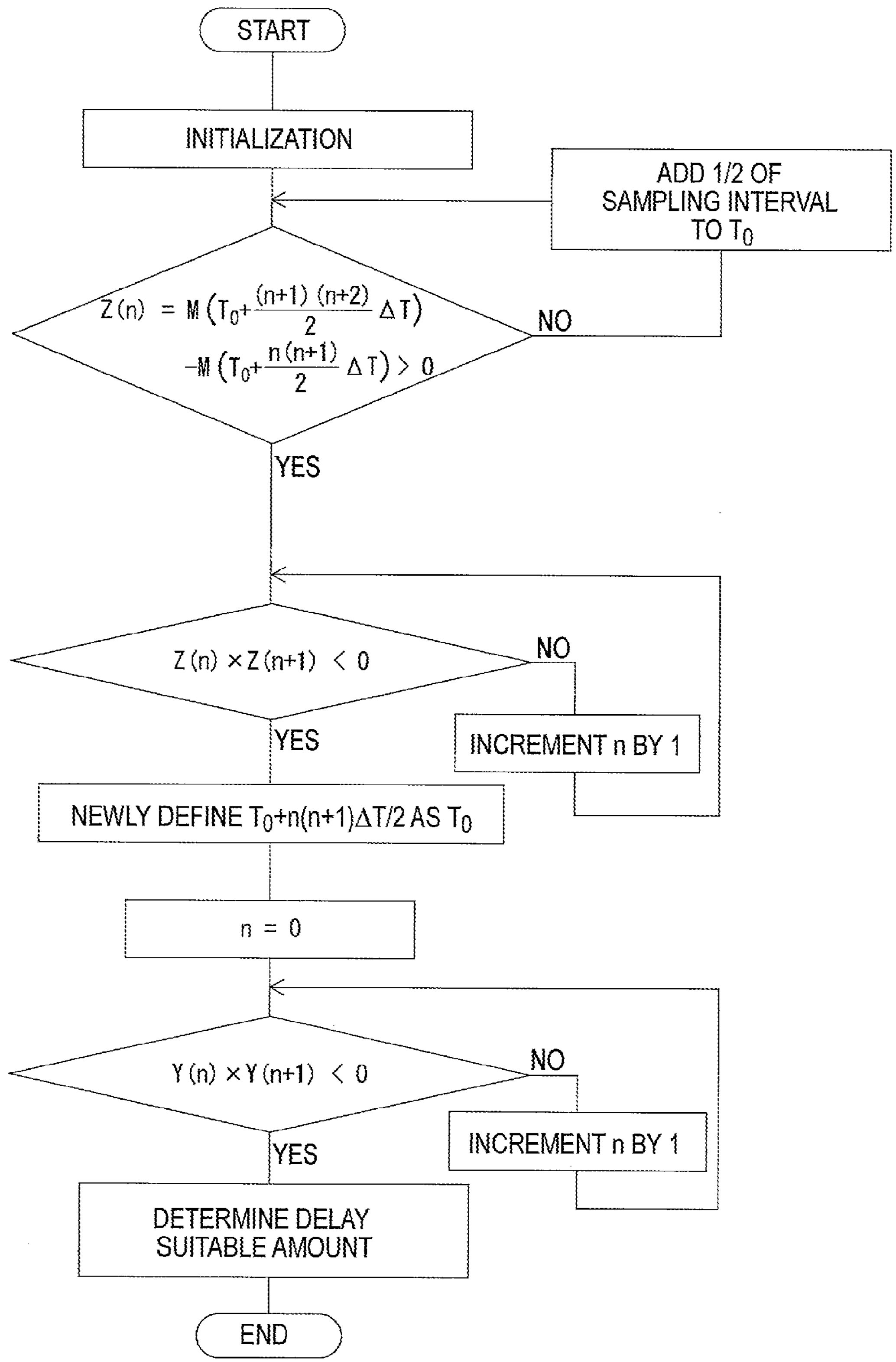
FIG. 9 is a flow chart for explaining a third method for extracting a timing value.

Referring to FIG. 9, a third method for extracting a timing value will be described. FIG. 9 is a flow chart for explaining the third method for extracting a timing value. In the second method described above, a delay adjustment amount for determining the delay suitable amount may be fixed to $\Delta T$. In contrast, the third method is different in that the delay adjustment amount is gradually increased to speed up the processing for determining the delay suitable amount.

First, a maximum value $M(T_0)$ of output signal intensity of any sampling timing, and a maximum value $M(T_0+\Delta T)$ of output signal intensity when the sampling timing is shifted by $\Delta T$ may be acquired as initialization.

When a parameter n is 0, a positive or a negative of a gradient $Z(0)=M(T_0+\Delta T)-M(T_0)$ may be determined. When the gradient $Z(0)$ is a negative, the gradient is a negative gradient. The maximum value of the output signal intensity increases for ½ of a sampling interval to reach maximum intensity, and then decreases for ½ of the sampling interval. That is, the increase and the decrease are repeated by using the sampling interval as one cycle. Here, when the gradient $Z(0)$ is negative, ½ of the sampling timing may be added to the sampling timing T, and signal intensity $M(T_0)$ and $M(T_0+\Delta T)$, and a gradient $Z(0)$ may be acquired again. In this case, typically $Z(0)>0$ is obtained.

Next, the polarity of the gradient may be compared. A point where the gradient $Z(n)$ is 0 is an extreme value, but the gradient often fails to be 0. Therefore, the extreme value may be obtained by inversion of the polarity of the gradient $Z(n)$. Here, a positive or a negative of $Z(n)\times Z(n+1)$ may be determined, while incrementing n of an integer n of 0 or more from 0 by 1. Here, the $Z(n)$ is given by $Z(n)=M(T_0+(n+1)\times(n+2)\times\Delta T/2)-M(T_0+n\times(n+1)\times\Delta T/2)$. For example, $Z(0)=M(T_0+\Delta T)-M(T_0)$, $Z(1)=M(T_0+3\Delta T)-M(T_0+\Delta T)$, $Z(2)=M(T_0+6\Delta T)-M(T_0+3\Delta T)$, and so on are obtained.

Here, when $Z(n)\times Z(n+1)<0$ is obtained as a result of the determination of a positive or a negative of $Z(n)\times Z(n+1)$, the delay adjustment value often exceeds the minimum unit. Therefore, in this case, a positive or a negative of $Z(n)\times Z(n+1)$ may be determined by using $T=T_0+n\times(n+1)\times\Delta T/2$, while incrementing n from 0 by 1, as is the case with the second method. As a subsequent procedure is similar to that of the second method, repeated explanation thereof is omitted.

Figure 10A:
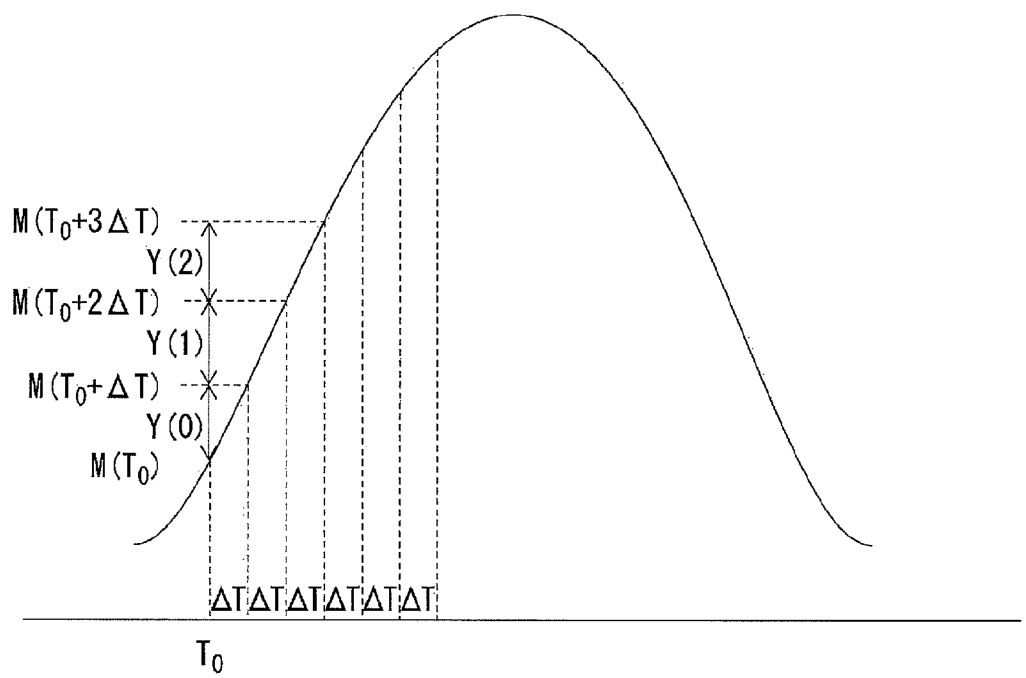
FIG. 10A is a schematic diagram for explaining the second method.
Figure 10B:
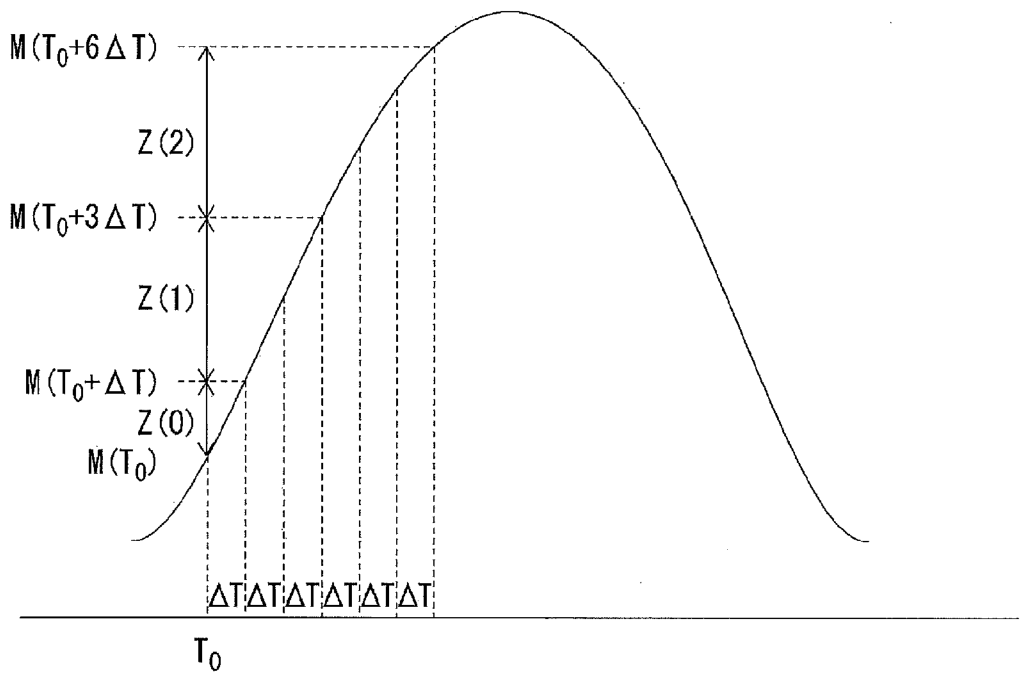
FIG. 10B is a schematic diagram for explaining the third method.

Referring FIG. 10A and FIG. 10B, a difference between the second method and the third method will be described. FIG. 10A is a schematic diagram for explaining the second method; and FIG. 10B is a schematic diagram for explaining the third method. In the second method shown in FIG. 10A, the extreme value is obtained while changing the delay amount by the constant delay adjustment amount $\Delta T$, thereby requiring the determination by the number of times obtained by dividing ½ of the sampling interval by the minimum unit $\Delta T$.

In contrast, according to the third method shown in FIG. 10B, when the gradient is positive, the delay adjustment amount is gradually increased, and the delay is adjusted around where the polarity of the gradient is inverted, by using the delay adjustment amount as the minimum unit. As a result, in the third method, the number of determinations can be reduced compared to the second method, and a converging time is expected to be reduced.

The same effect as the first method described above can be obtained in any of the second method and the third method.

What is claimed is:

1. An electrical dispersion compensator comprising:

a sampling unit that generates a sampling signal by sampling inputted data at a predetermined sampling rate;

an equalizing unit that generates an output signal by branching the sampling signal into signals of a tap count (L), weights the branched signals using a tap coefficient, adds a delay to the weighted signals so as to have a time difference from each other, the time difference being obtained by dividing a bit period (T) by a sampling rate (K), and adds the weighted and delayed signals;

a tap coefficient calculating unit that determines a tap coefficient to adjust the output signal of the equalizing unit based on a training signal, and provides the tap coefficient to the equalizing unit;

a delay adjusting unit that adjusts sampling timing by adding a predetermined delay to a clock signal, and provides the delayed clock signal to the sampling unit;

a peak monitoring unit that acquires maximum values of signal intensity of the sampling signal; and a timing value extracting unit that provides a magnitude of the delay to the delay adjusting unit, acquires the magnitude of the delay when the maximum value of the output signal intensity is the greatest, as a suitable delay amount, from a plurality of sets of the magnitude of the delay provided by the delay adjusting unit and the maximum values of the output signal intensity acquired by the peak monitoring unit, and provides the suitable delay amount to the delay adjusting unit, wherein the timing value extracting unit determines an approximate curve of the plurality of sets of the magnitude of the delay provided by the delay adjusting unit and the maximum values of the output signal intensity acquired by the peak monitoring unit, and acquires the magnitude of the delay where the approximate curve becomes the greatest, as the suitable delay amount.

2. An electrical dispersion compensator comprising:

a sampling unit that generates a sampling signal by sampling inputted data at a predetermined sampling rate;

an equalizing unit that generates an output signal by branching the sampling signal into signals of a tap count (L), weights the branched signals using a tap coefficient, adds a delay to the weighted signals so as to have a time difference from each other, the time difference being obtained by dividing a bit period (T) by a sampling rate (K), and adds the weighted and delayed signals;

a tap coefficient calculating unit that determines a tap coefficient to adjust the output signal of the equalizing unit based on a training signal, and provides the tap coefficient to the equalizing unit;

a delay adjusting unit that adjusts sampling timing by adding a predetermined delay to a clock signal, and provides the delayed clock signal to the sampling unit;

a peak monitoring unit that acquires maximum values of signal intensity of the sampling signal; and a timing value extracting unit that provides a magnitude of the delay to the delay adjusting unit, acquires the magnitude of the delay when the maximum value of the output signal intensity is the greatest, as a suitable delay amount, from a plurality of sets of the magnitude of the delay provided by the delay adjusting unit and the maximum values of the output signal intensity acquired by the peak monitoring unit, and provides the suitable delay amount to the delay adjusting unit, wherein the timing value extracting unit compares a maximum value $M(T_0)$ of signal intensity having a predetermined magnitude of a delay $T_0$ with a maximum value $M(T_0+\Delta T)$ of signal intensity when adding a minimum unit $\Delta T$ of a delay change to the predetermined magnitude of the delay $T_0$, wherein, when the maximum value $M(T_0)$ is larger, the timing value extracting unit newly defines a value obtained by adding ½ of a sampling interval of the sampling unit to the predetermined magnitude of the delay $T_0$ as magnitude of a delay $T_0$, and makes the comparison described above, wherein, when the maximum value $M(T_0+\Delta T)$ is larger, the timing value extracting unit determines a positive or a negative of $Y(n)\times Y(n+1)$ of a gradient $Y(n)$ given by $Y(n)=M(T_0+(n+1)\times\Delta T)-M(T_0+n\times\Delta T)$ while incrementing n of an integer n of 0 or more by 1, and wherein, when $Y(n)\times Y(n+1)<0$ is obtained as a result of the determination of a positive or a negative of $Y(n)\times Y(n+1)$, the timing value extracting unit acquires $T=T_0+(n+1)\times\Delta T$ as the suitable delay amount.

3. A tap coefficient calculation method for an electrical dispersion compensator, the electrical dispersion compensator comprising:

a sampling unit that generates a sampling signal by sampling inputted data at a predetermined sampling rate;

an equalizing unit that generates an output signal by branching the sampling signal into signals of a tap count (L), weights the branched signals using a tap coefficient, adds a delay to the weighted signals so as to have a time difference from each other, the time difference being obtained by dividing a bit period (T) by a sampling rate (K), and adds the weighted and delayed signals;

a tap coefficient calculating unit that determines a tap coefficient to adjust the output signal of the equalizing unit based on a training signal, and provides the tap coefficient to the equalizing unit;

a delay adjusting unit that adjusts sampling timing by adding a predetermined delay to a clock signal, and provides the delayed clock signal to the sampling unit;

a peak monitoring unit that acquires maximum values of signal intensity of the sampling signal; and a timing value extracting unit that provides a magnitude of the delay to the delay adjusting unit, acquires the magnitude of the delay when the maximum value of the output signal intensity is the greatest, as a suitable delay amount, from a plurality of sets of the magnitude of the delay provided by the delay adjusting unit and the maximum values of the output signal intensity acquired by the peak monitoring unit, and provides the suitable delay amount to the delay adjusting unit, the method comprising:

acquiring the plurality of sets of the magnitude of the delay provided by the delay adjusting unit and the maximum values of the output signal intensity acquired by the peak monitoring unit;

determining an approximate curve of the plurality of sets of the magnitude of the delay and the maximum values of the output signal intensity;

acquiring a magnitude of a delay where the approximate curve becomes greatest, as the suitable delay amount; and calculating the tap coefficient after providing a delay of the suitable delay amount to the clock signal in the delay adjusting unit.

* * * * *